United States Patent [19]

Mooney et al.

[11] 3,794,362
[45] Feb. 26, 1974

[54] RAINTIGHT CONNECTOR FOR ELECTRICAL CONDUIT

[75] Inventors: Thomas Mooney, Mt. Sinai; Richard A. Bauer, Mastic Beach, both of N.Y.

[73] Assignee: Electrical Fittings Corporation, East Farmingdale, N.Y.

[22] Filed: Oct. 16, 1972

[21] Appl. No.: 297,656

[52] U.S. Cl............... 285/340, 285/341, 285/382.7
[51] Int. Cl.............................................. F16l 19/08
[58] Field of Search...285/341, 342, 382.7, 340, 343, 285/321; 24/25, 22, 23 R, 38, 217; 287/108, 115

[56] References Cited
UNITED STATES PATENTS

| | | | |
|---|---|---|---|
| 3,485,517 | 12/1969 | Howe | 285/382.7 X |
| 2,187,880 | 1/1940 | Kaysing | 285/341 X |
| 1,040,790 | 10/1912 | Sherman | 287/108 |
| 3,423,957 | 1/1969 | Palmer | 287/108 X |
| 2,911,460 | 11/1959 | Oxley | 287/108 X |
| 2,386,473 | 10/1945 | Kanary | 287/108 |
| 2,255,673 | 9/1941 | McDermott | 285/382.7 |

*Primary Examiner*—Thomas F. Callaghan
*Attorney, Agent, or Firm*—Howard C. Miskin

[57] ABSTRACT

A vapor-proof connector on a metal electric conduit includes an externally threaded tubular body engaging the end of the conduit and a gland nut spaced inwardly of an engaging the tubular body. The gland nut has an inwardly directed peripheral flange with a tapered inside face confronting a tapered end face of the body to delineate an annular space which surrounds the conduit and houses a channel-shaped resilient split metal ring having inwardly directed diverging flanges provided at its split ends with opposing reduced width tongues having enlarged arrow-shaped heads terminating in vertical flat end faces. A coupler of external shape similar to but thicker than that of the split ring has a rectangular longitudinal bore interrupted by a transverse wall. The tongues engage the bore and the tightening of the gland nut compresses the ring to urge the end faces of the ring and head into sealing engagement with the coupler end faces.

11 Claims, 5 Drawing Figures

PATENTED FEB 26 1974　　　　　　　　　　　　　　3,794,362
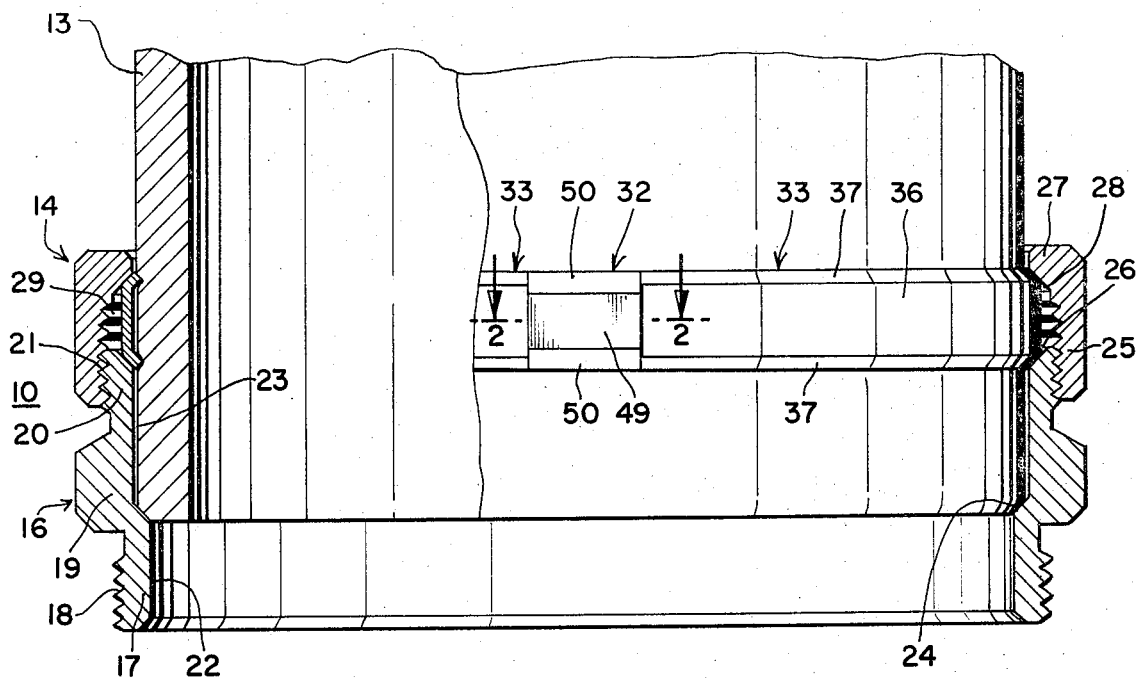
*Fig. 1.*
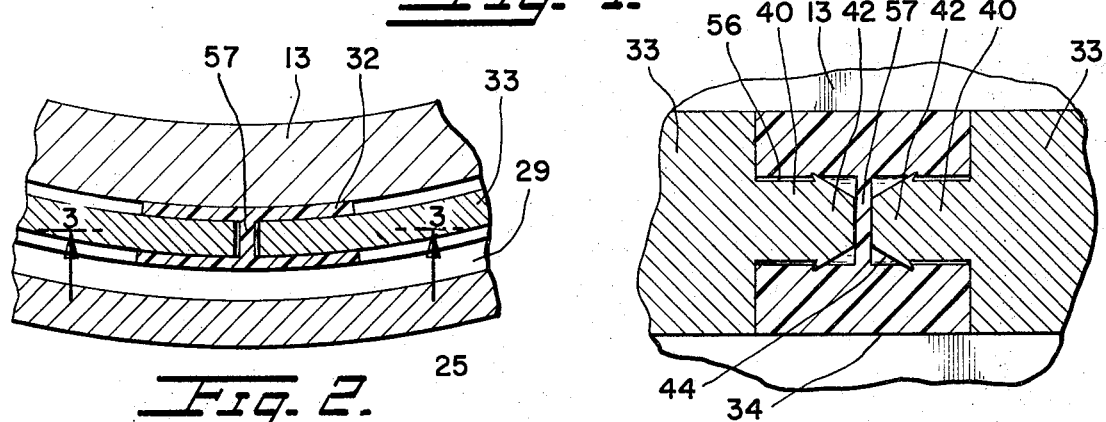
*Fig. 2.*　　　*Fig. 3.*
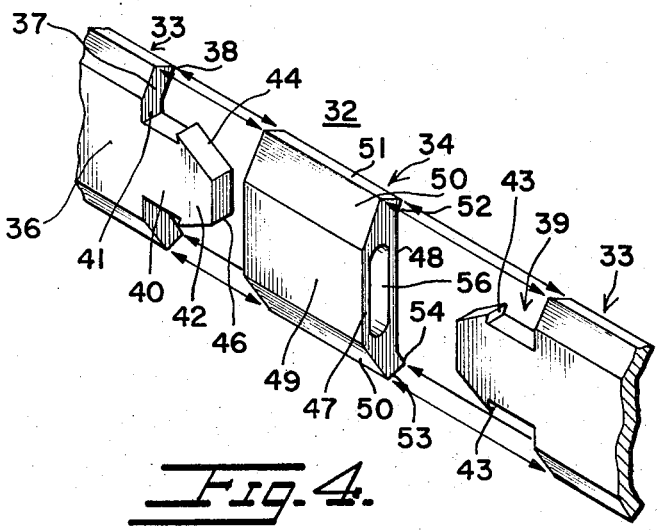
*Fig. 4.*
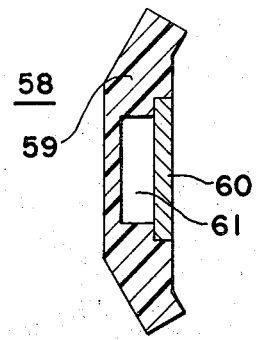
*Fig. 5.*

RAINTIGHT CONNECTOR FOR ELECTRICAL CONDUIT

BACKGROUND OF THE INVENTION

The present invention relates generally to improvements in coupling devices for electrical conduits and it relates particularly to an improved connector for hermetically sealed attachment to relatively large diameter electrical conduit of the rigid metal type.

An electrical conduit in widespread use is of the rigid metal type. In order to maintain the vapor-proof integrity of an installation employing the vapor-proof metal conduit, it is necessary that any connectors or couplings associated with the conduit which facilitate its connection to junction boxes and other fittings be attached to the conduit in a firm vapor-proof or hermetically sealed manner. The couplings heretofore employed or proposed for attachment to rigid metal conduit possess numerous drawbacks and disadvantages. They are unreliable, generally complicated devices which are difficult and time-consuming to apply, they often do not produce a vapor-proof attachment to the conduit, particularly in the case of large diameter conduits, thereby failing to prevent the penetration of moisture and corrosive and solvent vapors, gasses and liquids into the conduit, and are of little versatility and adaptability and otherwise leave much to be desired.

SUMMARY OF THE INVENTION

It is a principal object of the present invention to provide an improved conduit coupling device.

Another object of the present invention is to provide an improved connector for large diameter electrical conduit.

Still another object of the present invention is to provide an improved coupling device for hermetically sealed attachment to rigid metal electrical conduit.

A further object of the present invention is to provide an improved screw connector for hermetically sealed attachment to vapor-proof rigid electrical conduit of large diameter.

Still a further object of the present invention is to provide a device of the above nature characterized by its reliability, ruggedness, simplicity, low cost, ease and convenience of operation and high versatility and adaptability.

The above and other objects of the present invention will become apparent from a reading of the following description taken in conjunction with the accompanying drawing which illustrates preferred embodiments thereof.

In a sense the present invention contemplates the provision of a connector device for an electrical conduit comprising first and second collars having mating inner and outer threaded sections and inner peripheral confronting faces delineating an annular space, a split ring formed of a relatively hard material registering with the annular space, tongues of reduced width directed toward each other from the ends of the split ring, and a coupling member or spacer of a resilient plastic material disposed between the ends of the ring and having a longitudinal bore engaged by the tongues, the split ring being entrapped between the collar confronting faces to compress the ring to bring its end faces into tight engagement with the coupling member.

In the preferred form of the improved device the split ring is channel-shaped with inwardly directed diverging flanges and the tongues are medially aligned and provided with enlarged heads having top and bottom edges converging to flat vertical end faces. The coupling member is formed of a resilient synthetic organic polymeric resin and is generally of the same outside shape as the ring and the longitudinal bore is of rectangular transverse cross-section and partitioned by a medial transverse wall. In the closed sealed condition of the device, the ring is contracted by tightening the gland nut to bring the end faces of the ring into tight engagement with the end faces of the coupling member and the end faces of the tongues in spaced relation with the spacer transverse wall.

The improved coupling device is simple, rugged and easy to apply and produces a reliable vapor-proof seal.

BRIEF DESCRIPTION OF THE DRAWING

FIG. 1 is a front elevational view, partially in section, of a connector device embodying the present invention, illustrated as applied to a metal electrical conduit;

FIG. 2 is a sectional view taken along line 2 — 2 in FIG. 1;

FIG. 3 is a sectional view taken along line 3 — 3 in FIG. 2;

FIG. 4 is a fragmentary exploded perspective view of the split ring and end coupler member of the improved device; and FIG. 5 is a transverse sectional view of another form of coupler member.

DESCRIPTION OF THE PREFERRED EMBODIMENT

Referring now to the drawing, particularly FIGS. 1 to 4 thereof which illustrate a preferred embodiment of the present invention, the reference numeral 10 gznerally designates the improved coupling device which is applied to a metal electrical conduit 13 of conventional construction and which may be of large diameter.

The coupling device 10 comprises an inner gland nut defining first collar 14 and an outer body member defining second collar 16. The second collar 16 is an integrally formed unit and includes a front section 17 provided with an external connector thread 18, an intermediate section 19 provided with peripherally spaced outwardly projecting wings or flats for engagement by a suitable wrench, and an inner section 20 likewise provided with an external thread 21. The inside face 22 of collar section 17 is of a diameter between those of the outside and inside diameters of conduit 13, and the inside face 23 of intermediate and inner sections 19 and 20 is of slightly greater diameter than the outside diameter of conduit 13. The inside faces 22 and 23 are joined by a rearwardly outwardly inclined shoulder defining face 24 and the inner rear corner of inner body section 20 is likewise rearwardly outwardly inclined to provide a shoulder or face 26.

The first collar 14 includes a forward internally threaded section 25 which engages thread 21 and is provided at its rear with an inwardly directed peripheral lip 27 terminating at about the plane of face 23. The forward face of lip 27 is forwardly outwardly inclined to provide a shoulder defining lip 28. The confronting shoulders 26 and 28 and the inside face of collar 14 delineate an annular space 29.

Housed in the annular space 29 and extending for the full periphery thereof is a sealing and anchoring or securing assembly 32 which includes a split ring 33 and a coupling member or spacer 34. The split ring 33 is formed of a relatively hard material, advantageously a resilient metal, and is circumferentially contractable and the coupling member 34 is formed of a relatively soft, resilient plastic material, advantageously a synthetic organic polymeric resin, for example, a nylon, a polyvinyl chloride, or the like. The plastic could be soft, compressible or hard and rigid, as long as it is resilient.

The split ring 33 is of channel-shape transverse cross-section, including an outer vertical wall 36 and inwardly directed relatively sharply diverging flanges 37 which terminate in sharp inner biting edges 38. Integrally formed with the confronting end faces of split ring walls 36 are medially located longitudinally aligned similarly shaped tongues 39. The tongues 39 are of the same thickness as wall 36 and each includes a rectangular shank 40 of lesser width than wall 36 and delineated from the end face of split ring 33 by flat vertical shoulders 41. Each tongue 40 includes a vertically enlarged head defining front end section 42 delineated from shank 40 by opposite vertical shoulders 43, the top and bottom faces 44 of head 42 converging forwardly from the sharp outer edges of shoulders 43 to the respective top and bottom edges of the vertical front face 46 of the head 39. The shoulders 41 and tongue end faces 46 are advantageously flat. In the relaxed condition of split ring 33, the tongue and walls are circumferentially spaced from each other and in the fully contracted condition of ring 33 they are advantageously parallel.

The coupler means of spacer 34 is of somewhat similar outside transverse configuration to that of split ring 33, but is of greater thickness, i.e., about one ten thousandths (0.0001'') inch, and relatively short. Coupler 34 includes a vertical longitudinally extending wall 47 having parallel vertical inner and outer faces 48 and 49, the inside face 48 being wider than the outside face 49. Inwardly diverging faces 50 extend from the longitudinal edges of face 49 and are joined at their upper and lower edges by inwardly converging longitudinal end faces 51. The inner edges of faces 51 are joined to inner face 48 by inside faces 52 which are parallel to faces 50, the faces 50, 51 and 52 delineating inwardly diverging flanges 53 terminating in inner edges 54.

Medially formed in coupling member 34 is a longitudinal bore 56 of rectangular shape whose top and bottom end faces may be flat or somewhat curved, as illustrated. Bore 56 is of a length somewhat greater than twice the length of a tongue 40 including its head 42 and of a width less than the vertical distance between the sharp outer edges of shoulders 43 and greater than the width of shank 40. Medially located in bore 56 and integrally formed with the body of coupling member 34 is a transverse partition wall 57 which divide the bore 56 into opposite similar open ended sections.

In the assembled untightened condition of the sealing assembly 32, the tongues 39 engage the opposite sections of the bore 56, and the diameter of the assembly, as it is housed in annular space 29 is somewhat greater than that of conduit 13.

The connector 10 is attached to the conduit 13 and sealed thereto by sliding the connector over the end of conduit 13, gland nut 14 foremost, until the shoulder 24 engages the outer peripheral edge of conduit 13. The gland nut 14 is then tightened with shoulders 26 and 28 bearing on the outer faces of split ring flanges 37 and on coupler member faces 50 to contract the split ring 33 to a sealing and conduit anchored condition. In the sealed and anchored condition of the coupling assembly 10, the split ring flange edges 38 bite into the outside face of conduit 13 as shown in FIG. 1 to effect a firm and hermetically sealing engagement therewith, the collar shoulders 26 and 28 being in sealing engagement with the outer faces of flanges 37. In addition the split ring shoulders 41 bear on the coupling member end faces to effect a fluid tight engagement therewith and to longitudinally compress the coupling member 32 into fluid-tight engagement with conduit 13. The slight additional thickness of spacer 32 is compressed during tightening to overlap the junction of the split ring and the spacer to provide a good fluid-tight seal. The tongue end faces 46 advantageously approach but do not bear on longitudinally compress wall 57. This spacing allows for minor variations in the diameter of the conduit and split ring and prevent the ends of the ring to abut and prevent a good seal with the conduit outer surface. The top edges of heads 42 bite into the top and bottom faces of bore 56 and the side faces of tongues 39 tightly engage the side faces of bore 56. As a result the coupling device 10 is firmly anchored and hermetically sealed to conduit 13.

In order to facilitate the assembly of the split ring and the coupling member, the coupling member may be formed of two separate elements which are joined to each other, as illustrated in FIG. 5. Specifically, the coupling member 58, which is formed of a material similar to that of coupling member 32 and is of the same general configuration, includes a main body member 59 and an inner closure panel 60. The main body member 59 has a longitudinal channel 61 formed in its inside face interrupted by an intermediate transverse partition corresponding to partition wall 57. The inner side edges of channel 61 are stepped, the stepped portions being engaged by the co-extensive rectangular panel 60 which is suitably cemented or otherwise secured in position, advantageously following the assembly of the coupling member 58 with the split ring corresponding to ring 33, the inside faces of panel 60 and body member 59 being coplanar. In all other respects in shape, dimensions and functioning the coupling members 32 and 58 are similar as are their operations.

While the ends of split ring 33 is shown having heads with tongues, these could be eliminated if the assembly is mounted on the conduit carefully and not further handled. The tongues prevent accidental separation and disassembly of the split ring and coupling member during mounting on the conduit. Also, if the split rings could be dimensioned to the conduit so as not to abut, then the ends of the split ring could abut the medial wall of the spacer and provide added sealing protection.

While there have been described and illustrated preferred embodiments of the present invention it is apparent that numerous alterations, omissions and additions may be made without departing from the spirit thereof.

What is claimed is:

1. A connector device for an electrical conduit comprising first and second collars having mating inner and outer threaded sections and inner peripheral confronting faces delineating an annular space, a split ring formed of a relatively hard material registering with said annular space and having confronting end faces, axially aligned tongues of reduced width directed toward each other from said ring end faces, and a coupling member of a non-metallic resilient material disposed between said ring end faces and having a longitudinal bore peripherally aligned with and engaged by said tongues, said coupling member having end faces said split ring being entrapped between said collar confronting faces and being compressible thereby to bring said ring end faces into compressible sealing engagement with said end faces of said coupling member.

2. The connector device of claim 1 wherein said coupling member is formed of a synthetic organic polymeric resin and said split ring is formed of a resilient metal.

3. The connector device of claim 2 wherein said split ring includes inwardly diverging annular flanges.

4. The connector device of claim 3 wherein said tongues are longitudinally aligned and are delineated from said split ring by upper and lower shoulders defining said confronting end faces, which are in hermetically sealing engagement with the end faces of said coupling member.

5. The connector device of claim 4 wherein said coupling member includes a transverse wall extending across said bore between the ends thereof, the confronting ends of said tongues facing the opposite faces of said transverse wall.

6. The connector device of claim 5 wherein each of said tongues is of lesser width than said bore and terminates in an enlarged head of greater width than said bore.

7. The coupling device of claim 6 wherein each of said heads terminates in a vertical end face, the top and bottom edges of said head converging toward said end face.

8. The coupling device of claim 1 wherein said coupling member is of channel shape with inwardly diverging longitudinal flanges.

9. The device of claim 1 wherein said coupling member comprises an integrally formed unit.

10. The coupling device of claim 5 wherein the end faces of said tongues bear on opposite faces of said transverse wall of said coupling member.

11. The device of claim 1 wherein said coupling member comprises an outer section having a longitudinal channel formed thereon and an inner panel secured to the inner face of said outer section in registry with said channel to delineate said longituding bore.

* * * * *